US008662246B2

(12) United States Patent
Classen et al.

(10) Patent No.: US 8,662,246 B2
(45) Date of Patent: Mar. 4, 2014

(54) DOMESTIC APPLIANCE HAVING AT LEAST ONE NOISE-DEADENING AND/OR SOUND-INSULATING COATING AND ASSOCIATED PRODUCTION METHOD

(75) Inventors: Egbert Classen, Stahnsdorf (DE); Heiko Fritz, Herbrechtingen (DE); Bernd Schwenk, Laulngen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 166 days.

(21) Appl. No.: 13/167,748

(22) Filed: Jun. 24, 2011

(65) Prior Publication Data

US 2012/0012420 A1 Jan. 19, 2012

(30) Foreign Application Priority Data

Jul. 16, 2010 (DE) ......................... 10 2010 031 492

(51) Int. Cl.

| | |
|---|---|
| ***G10K 11/168*** | (2006.01) |
| ***E04B 1/82*** | (2006.01) |
| *G10K 11/16* | (2006.01) |
| *E04B 1/74* | (2006.01) |
| *C09J 4/00* | (2006.01) |

(52) U.S. Cl.
USPC ............................ 181/200; 181/290; 156/337

(58) Field of Classification Search
USPC ................. 181/200, 201, 202, 290, 285, 294; 134/56 D, 184, 198, 115 R, 58 D
See application file for complete search history.

(56) References Cited

U.S. PATENT DOCUMENTS

| | | | | |
|---|---|---|---|---|
| 4,287,263 A * | 9/1981 | Woodring et al. | ............ | 428/489 |
| 4,308,308 A * | 12/1981 | Sachse | .......................... | 428/168 |
| 4,734,323 A * | 3/1988 | Sato et al. | .................. | 428/317.3 |
| 4,825,974 A * | 5/1989 | Hoffmann et al. | ............ | 181/290 |
| 5,094,318 A * | 3/1992 | Maeda et al. | ................ | 181/290 |
| 5,712,038 A * | 1/1998 | Yamazaki et al. | ......... | 428/411.1 |
| 5,965,851 A * | 10/1999 | Herreman et al. | ............ | 181/200 |
| 6,109,389 A * | 8/2000 | Hiers et al. | .................... | 181/290 |
| 6,152,259 A * | 11/2000 | Freist et al. | ................... | 181/290 |
| 6,231,967 B1 * | 5/2001 | Neukirchen | .................. | 428/332 |
| 8,205,287 B2 * | 6/2012 | Rockwell et al. | ................. | 8/158 |
| 8,302,280 B2 * | 11/2012 | Neff et al. | ....................... | 29/428 |

(Continued)

FOREIGN PATENT DOCUMENTS

| | | | |
|---|---|---|---|
| DE | 4110291 A1 * | 10/1992 | ............. A47L 15/42 |
| DE | 4227957 A1 * | 2/1994 | ............. A47L 15/42 |

(Continued)

OTHER PUBLICATIONS

DE 102008030539 (Classen)—Translation Document printed Apr. 5, 2013.*
European Search Report EP 11 17 2613, Oct. 2012.

*Primary Examiner* — Edgardo San Martin
(74) *Attorney, Agent, or Firm* — James E. Howard; Andre Pallapies

(57) ABSTRACT

A domestic appliance, in particular a domestic dishwasher, includes at least one component, and at least one noise-deadening and/or sound-insulating coating applied on the component. The noise-deadening and/or sound-insulating coating includes or is made entirely of a reactively cured bituminous mixture. The component can be a wall section for delimiting a rinsing chamber of the dishwasher, or can be a base tray of a rinsing container of the dishwasher.

23 Claims, 5 Drawing Sheets

(56) References Cited

U.S. PATENT DOCUMENTS

| | | | | |
|---|---|---|---|---|
| 2006/0266385 | A1 | 11/2006 | Malaker | |
| 2007/0119481 | A1* | 5/2007 | Jerg | 134/25.2 |
| 2008/0001431 | A1* | 1/2008 | Thompson et al. | 296/187.01 |
| 2010/0024851 | A1* | 2/2010 | Rockwell et al. | 134/200 |
| 2010/0282632 | A1* | 11/2010 | Schabel, Jr. | 206/524.1 |
| 2011/0139542 | A1* | 6/2011 | Borroni | 181/290 |
| 2011/0180116 | A1* | 7/2011 | Druecker et al. | 134/115 R |
| 2011/0232701 | A1* | 9/2011 | Colon et al. | 134/198 |

FOREIGN PATENT DOCUMENTS

| | | | | | |
|---|---|---|---|---|---|
| DE | 19803527 | A1 | | 2/1999 | |
| DE | 19812942 | A1 | | 9/1999 | |
| DE | 19858002 | A1 | | 6/2000 | |
| DE | 102005061805 | A1 | * | 6/2007 | |
| DE | 102008030539 | A1 | * | 12/2009 | G10K 11/168 |
| EP | 244615 | A2 | * | 11/1987 | B60R 13/08 |

* cited by examiner

DOMESTIC APPLIANCE HAVING AT LEAST ONE NOISE-DEADENING AND/OR SOUND-INSULATING COATING AND ASSOCIATED PRODUCTION METHOD

BACKGROUND OF THE INVENTION

The present invention relates to a domestic appliance having at least one component that has at least one noise-deadening and/or sound-insulating coating.

A method for deadening component noise by applying a noise-deadening coating is known from DE 198 58 002. The component is a metal rinsing-reservoir wall belonging to a dishwasher's rinsing reservoir. The noise-deadening coating is embodied as a bitumen mat that is stuck into position by means of either melted—which is to say hot—adhesives or a detachable—which is to say cold—adhesive.

It is disadvantageous that the use of hot or warm adhesives is unsuitable for temperature-sensitive components that are made of plastic, for example, or are lacquered or coated particularly with a plastic-based material because the application of heat accompanying the use of warm adhesives would impermissibly thermally stress or damage a component of such kind or its possible lacquer or other coating, or even cause the component to be permanently deformed. Nor, though, is the use of cold-bonding adhesives suitable for components made of plastic because cold-bonding adhesives in practice often have too little adhesive power to adhere adequately to plastic, and plastic has only low mechanical strength that limits the pressing forces permitted for pressing the bitumen mats into position.

BRIEF SUMMARY OF THE INVENTION

It is an object of the present invention to provide a domestic appliance having at least one component that can be simply and reliably noise-deadened and/or sound-insulated without exposing the respective component to impermissibly high temperatures while the noise-deadening and/or sound-insulating coating is being produced and/or applied.

Said object is achieved in a domestic appliance of the kind cited in the introduction through the noise-deadening and/or sound-insulating coating's being or including a reactively cured bituminous mixture.

The present invention relates to a domestic appliance, with the respective noise-deadening coating's and/or sound-insulating layer's being or including a reactively cured bituminous mixture. The reactively curing bituminous mixture will cause only slight to even no warming while being worked and being applied to the domestic appliance's structural element respectively requiring to be noise-deadened or, as the case may be, to said appliance's component respectively requiring to be noise-deadened and/or sound-insulated. Nor will any external heat source be required for heating the reactively curing bituminous mixture and/or the component respectively requiring to be noise-deadened and/or sound-insulated as is by contrast necessary in the working of hot or, as the case may be, melted adhesives. The component respectively requiring to be noise-deadened and/or sound-insulated can hence also itself be embodied as temperature-sensitive. It can in particular be made of plastic and/or possibly also be covered with a heat-sensitive lacquer, primer, and/or coating consisting in particular of at least one plastic material. The reactively curing bituminous mixture will not harden on the component respectively requiring to be provided with a noise-deadening coating and/or sound-insulating layer until after being applied and will then in its final state form a layer of reactively cured bituminous mixture. Being advantageously still in a preferably free-flowing but especially viscous state while being applied to the respective component, it can be precisely accommodated to said component's shape and/or contour, which, expressed in general terms, is to say to the local circumstances. If the respective component requiring to be noise-deadened and/or sound-insulated has, for instance, a three-dimensional structure, the reactively curable bituminous material can in its free-flowing but especially viscous state advantageously also be put into depressions in the component such as, for example, troughs, grooves, and recesses, etc. . . . , but also into corner, edge, and rounded regions or into cavities, etc. . . . , which, expressed in general terms, is to say also into regions of the component that are difficult to access from the outside and/or that are difficult or impossible to coat or, as the case may be, cover with a prefabricated, essentially planar bitumen mat. Being free-flowing but especially viscous while being worked, the reactively curing bituminous mixture is capable of possibly being applied to the respectively desired site or, as the case may be, region of the component respectively requiring to be noise-deadened and/or sound-insulated in a desired amount or volume and with a desired area of application, geometric shape, contour, and/or layer thickness especially or, as the case may be, specifically matched to said component. The free-flowing but especially viscous state in which the bituminous, reactively curing mass is applied will thus allow a multiplicity of application options for flexibly shaping and/or dimensioning the respective noise-deadening and/or sound-insulating coating. Specific matching of the respective noise-deadening and/or sound-insulating coating to the conditions at the respective application site is in particular made possible. Thus even curved or domed areas of the respective component can now be provided particularly easily with at least one noise-deadening and/or sound-insulating coating, something that an inherently stable, entirely solid, planar, prefabricated bitumen mat allows only with difficulty or not at all.

With the aid of the reactively curing bituminous mass which in its state when being worked is free-flowing but especially viscous it is also possible, if required, to fully encapsulate the respective component all round with a closed noise-deadening and/or sound-insulating coating. Thus, for example, a dishwasher's circulating pump can be largely hermetically sealed by means of a noise-deadening and/or sound-insulating jacket embodied in that way.

The respective component can, of course, also be partially encapsulated by means of the reactively curing bituminous mass which in its state when being worked is free-flowing but especially viscous.

Using in particular a spraying or extrusion-moulding method, said mass can furthermore be applied to one or more uneven surfaces of the respective component that are exposed to sonic waves.

It can also, if required, be put particularly into narrow gaps or parts of the respective component that are confined or inaccessible from the outside.

Noise deadening and/or sound insulating can in particular be provided for the respective component especially effectively because the reactively curing bitumen will bond extensively evenly with the component respectively requiring to be noise-deadened and/or sound-insulated, which is to say it will adhere over the region of adhesion thereon in a manner providing substantially full coverage with inclusions of air bubbles being largely avoided. The noise-deadening and/or sound-insulating coating can preferably have a plurality of regions of differing thickness. Owing to the reactively curing bituminous mixture's preferably free-flowing but especially viscous state, the respective noise-deadening and/or sound-insulating coating can in particular be applied selectively, which is to say in locally limited fashion, to the respectively desired, singular coating sites or, as the case may be, areas. The regions to which said mixture is applied do not therein have to be linked. Thus regions not having a noise-deadening and/or sound-insulating coating, which is to say free areas or, as the case may be, voids, will then also be provided on the respective component.

It can thus, for example, be expedient for, say, just a circular edge or torus region to be coated with the reactively curing bituminous mixture around the opening of a pump body, located roughly in the centre of the base tray, on the underside of the—in particular plastic—base tray of a dishwasher's rinsing container and for the rest of the base tray's underside surface surrounding said circular edge region to be kept free. Vibrational excitation due to the circulating pump, lye pump, and/or water diverter located in the pump body or the vicinity thereof and/or to any other activator unit that produces vibrations can be adequately compensated thereby without its being necessary for adequate noise deadening and/or sound insulating to coat the remaining area on the underside of the rinsing container's base tray with bitumen mass. It is thus possible, where applicable, to omit coating the entire underside of the base tray with the reactively curing, bituminous mixture, which will save on bituminous material. Because the reactively curable bituminous material having in the state in which it is applied a free-flowing but in particular viscous, malleable or paste-like consistency is applied only to one or more vibration-critical regions and/or to zones on the respective component that are relevant to sound insulating, it is possible to achieve an optimised, in particular spatially matched noise-deadening coating or, as the case may be, covering and/or insulating coating or covering for the component respectively requiring to be noise-deadened and/or sound-insulated and to save an amount of coating material from the reactively curing bituminous mixture compared with the case in which the entire coverable surface of the component respectively requiring to be noise-deadened is covered or, as the case may be, coated with the reactively curing bituminous mixture.

If the component belongs particularly to a domestic dishwasher or similar water-carrying domestic appliance, energy can be saved while the appliance is in operation or use because a smaller bituminous mass than when prefabricated bitumen mats are applied will now suffice owing to the locally adaptable layer thicknesses, contours, geometric shapes, and/or the only locally limited "on-site application" of the inventively embodied noise-deadening coating and/or sound-insulating coating. The material comprising the reactively curing, bituminous mixture applied only selectively in its free-flowing but especially viscous state to prespecified, desired noise-deadening and/or sound-insulating regions or, as the case may be, areas has owing to its smaller overall mass a lower thermal capacity than a conventional bitumen mat covering an entire area when stuck on, which is to say on the component's entire area exposed to sonic waves. The heat-storing effect of the inventively embodied reactively curing bituminous mass which in terms of its layer thickness is specifically or, as the case may be, locally matched and/or applied with just local limiting, which is to say selectively, is hence less during the respective heating operation associated with at least one water-carrying partial rinsing operation forming part of at least one rinsing operation implemented by a selected dishwashing program than in the design hitherto in which a conventional, prefabricated bitumen mat having a uniform or, as the case may be, constant layer thickness or, as the case may be, gauge is stuck on a full-coverage basis over the entire outer surface of the wall respectively requiring to be noise-deadened and/or sound-insulated—in particular the underside of the base tray—of the dishwasher's rinsing container by means of a hot-melt adhesive. Less thermal energy will hence be taken from the rinsing container's interior.

The inventive domestic appliance is in a preferred embodiment variant embodied particularly as a dishwasher. Such kind of noise-deadening coatings and/or sound-insulating layers are particularly important for dishwashers to be able to ensure their quiet operation.

The present invention can, where applicable, relate in particular to a component of a domestic appliance, with the respective noise-deadening coating and/or sound-insulating layer being a reactively cured bituminous mixture.

In a preferred embodiment variant the component is temperature-sensitive.

In a development of the preferred embodiment variant the component respectively requiring to be coated is made in particular of plastic, preferably polypropylene.

In another advantageous development of an expedient embodiment variant the component is coated with a—preferably temperature-sensitive—lacquer, primer, or other coating consisting in particular of plastic in each case.

In a preferred embodiment variant the noise-deadening and/or sound-insulating coating can be sprayed onto the component respectively requiring to be coated by means of a spraying device or nozzle device such as, for example, a nozzle head. The spraying or nozzle-application method is particularly easy to control. An extrusion-moulding device can alternatively be used for applying the material as a paste-like string which, where applicable, may also be spread or troweled on using an applicator.

What is understood by a bitumen mat as has been used hitherto as a noise-deadening and/or sound-insulating means on, for example, a dishwasher's rinsing container is in particular a mat of such kind produced using a bonding agent made of bitumen, also called mineral pitch, for example bitumen produced by crude-oil distillation, and/or of bitumen-like bonding agents such as, for instance, natural asphalts, polymeric bitumen, tars, pitches, waxes, paraffins, natural or synthetic resins, and/or distillation residues of fats and oils. The term "prefabricated" therein means that the bitumen mat is first produced independently of the component for which it is intended as a semi-finished or, as the case may be, preliminary product having defined dimensions so that it can then be secured to the component. A prefabricated bitumen mat can be produced, for example, by cutting or punching a piece of the desired size from a base mat.

The term "noise-deadening" relates in particular to reducing or obviating noises that are produced by exciting the component or parts thereof into a vibrating state. Annoying noises can develop particularly on thin-walled components such as, for example, a dishwasher's rinsing-container walls and/or door that are subjected to rinsing liquid, particularly spray jets, and thereby excited into a vibrating state. Vibrations of such kind can, though, be produced also by actuators such as, for example, pumps and blowers and suchlike. Noise deadening is now achieved in particular by applying a mass consisting of a reactively curable bituminous mixture to the respective, in particular typically thin-walled, component instead of a conventional, prefabricated bitumen mat so that the frequencies of the vibrations that occur will be lowered to the effect that the noises that develop will be less annoying. At least a part of the vibration energy can moreover be converted into heat through internal friction in the thus provided noise-deadening coating so that the noises produced will decrease in intensity. At least a part of the vibration energy can moreover be converted into heat through, where applicable, internal friction in the reactive-bitumen layer so that the noises produced will decrease in intensity. That can advantageously be accompanied by sound absorption.

The one or more reactive-bitumen layers that have been adhesively applied to the respective component can—possibly in combination with one or more, in particular prefabricated, bitumen mats that have been stuck onto the respective component by means of the reactively curable bituminous mixture—furthermore additionally or independently ensure that the respective component is noise-deadened, in particular also "sound-damped" or, as the case may be, "sound-insulated", because any sound waves coming from them will be reflected back.

The rinsing container's rinsing chamber can be largely completely encapsulated when the one or more reactive-bitumen layers have been applied to, for example, the base tray's exterior surfaces as well as all other walls of the rinsing container and also inside the door, in particular on the exterior side of the inside wall of the door, which is to say the inner door. Noises caused by spray jets while the dishwasher is operating will thereby be largely or totally prevented from penetrating to the outside.

It may possibly also be expedient for only the underside of the rinsing container's base tray to be coated with at least one application of reactively curable bituminous material or, where applicable, to be covered with one or more additional, prefabricated bitumen mats using one or more applications of reactively curable bituminous material on its underside, in particular to be pasted using the bituminous material which in its non-cured state has self-adhesive properties. The rinsing container's base tray can be adequately noise-deadened thereby so that, for example, vibrations and oscillations that could be caused during operation by the circulating pump and/or lye pump housed in a base module of the dishwasher underneath the rinsing container will be adequately intercepted or, as the case may be, "swallowed". Undesired exciting of the base tray into a vibrating state and a production of noise associated therewith will hence be largely obviated thereby. Sound insulating will in that way of course additionally be provided for the base tray so that any noises from inside the rinsing container that are caused by, for instance, drops of liquid dripping or dropping from, for example, the respective crockery basket or crockery placed therein and/or from the spraying equipment such as, for example, rotating spray arms, onto the top of the base tray can barely be ducted to the outside via the base module, or not at all.

In particular it can also be expedient for the door

The applied, reactively curing, bituminous material is in particular self-adhesive, which is to say it provides an adhesive layer wherever it makes contact with the one or more places or regions on the respective component that require(s) to be noise-deadened and/or sound-insulated. An additional adhesive layer can therefore advantageously be omitted because the applied, reactively curing, bituminous mass itself has adhesive properties. After curing it will be firmly, which is to say materially, bonded to the component respectively requiring to be noise-deadened and/or sound-insulated.

Reactively curable bituminous mixtures therein include in particular at least one basic bonding agent made of bitumen, also called mineral pitch, or of bitumen-like bonding agents, which at a scheduled working temperature with nothing further being added exhibits such high viscosity as to behave virtually like a solid.

The basic bonding agent can be, for example, bitumen produced by crude-oil distillation, natural asphalts, polymeric bitumen, tars, pitches, waxes, paraffins, natural or synthetic resins, and/or distillation residues of fats and oils.

So that the bituminous mixture can now be formed into a heavy adhesive layer it expediently contains at least one flux that will lower the mixture's viscosity sufficiently for it to be free-flowing at its scheduled working temperature, in particular at room temperature of around 20° C., meaning that it will behave like a liquid or a viscous material or a still malleable, non-cured mass. Fluxes are therein preferably solvents that are not easily volatilised, in particular oils with a mineral-oil base that are not easily volatilised, varieties of creosote, plant and animal fats and oils, carboxylic acids, and technical softening agents that are made of synthetic polymers and not easily volatilised and which will remain in the bituminous mixture even after it has cured, meaning they will not vaporise.

In order now to allow the bituminous mixture to cure after the respective noise-deadening coating or, as the case may be, covering and/or sound insulating has been formed, at least one reactive agent for producing an in particular physical and/or chemical effect increasing the viscosity of the mixture is added to it before the noise-deadening coating is formed. The added reactive agent's effect can therein be triggered by it automatically or by adding at least one activator.

Possibly interacting with the activator, the added reactive agent can in particular cancel the effect of the flux preferably irreversibly, for example though cross-linking or precipitating or by bonding to the basic bonding agent.

The added reactive agent can include, for example, chelate complex builders, acid anhydrides, alcohols, carboxylic acids, fatty amines, inorganic salts, cements, lime, gypsum, dolomite, ashes, slags, glasses, silica gels, and/or alums.

The activator can therein include in particular water, glycols, fatty alcohols, tensides, acids and lyes, metallic salts, sulphur, peroxides, latex, and/or synthetic resins.

Fluxes based on plant and/or mineral oils and/or resins can also be expedient. To generalise, the fluxes can in particular be obtained from renewable, which is to say regenerative, raw materials. The basic bonding agent, added reactive agent, and/or activator can additionally or independently thereof also be made from at least one renewable raw material.

According to a preferred embodiment variant, the reactively cured bituminous mixture has at least one first constituent and at least one second constituent, with the first constituent being or including a liquid constituent with bitumen and oil and/or resin, in particular consisting of renewable raw materials, that is mixed with one or more solid materials, in particular with at least one mineral component, preferably rock meal, Solnhofen cement, white fine lime, etc., and the second constituent being or including a hardener or, as the case may be, activator such as, for example, water.

The oil and/or resin made of a renewable raw material acts as a softening agent. Using the renewable raw material instead of bitumen will help protect the environment and have a neutral impact on the carbon dioxide balance.

Compared with known adhesives for securing bitumen mats to dishwasher components, the adhesive noise-deadening and/or sound-insulating coating provided by the reactively curing, bituminous mixture has superior adhesion properties both on a bitumen mat and on the customary surface materials of dishwasher components. In particular the reactively curing bituminous mass will adhere excellently to plastic parts, particularly to parts made of polypropylene. However, adequate and reliable adhesion of the respective noise-deadening and/or sound-insulating coating that consists of the reactively curable, bituminous mixture and to which a specific shape can be given will be ensured also on parts made of bright metal, particularly bright stainless high-grade steel. Adhesion to a metal part can in particular be enhanced by its pre-treatment such as, for example, with a primer or layer of paint or other coating consisting in each case preferably of at least one plastic material.

Owing to the good adhesion properties of the respective noise-deadening and/or sound-insulating coating consisting of the reactively curable, bituminous mixture it may be possible to dispense with pre-treating the component surface respectively requiring to be covered, for example with roughening, grinding, plasmatising, flame-treating, priming, and suchlike, and/or with an additional layer of adhesive, which will make the dishwasher easier to manufacture.

Compared with known hot-melt adhesives that typically require a working temperature of 130 to 200° C., for example, the adhesive layer of the reactively curable, bituminous mixture can—given suitably selected constituents—be produced with little or no additional heat, preferably at room temperature, in particular at around 20° C., which is to say "cold". A significant energy saving can be achieved thereby in the dishwasher's production. It may nevertheless be of practical advantage to provide for heat to be supplied while the respective noise-deadening and/or sound-insulating coating is being produced in order to accelerate curing. However, significantly lower temperatures, for example at most 60 to 70° C., than for producing, for instance, a join using a hot-melt adhesive will generally be adequate therefor.

No impermissibly high exothermal heating will moreover occur when the reactive bitumen itself is cured. Nor is it necessary for the curing process to introduce an impermissibly high level of heat from an external heat source which, for example, could subject a component—particularly a plastic part—requiring to be covered by a conventional, prefabricated bitumen mat to an impermissibly high thermal stress, and in particular deform or even destroy it.

Hence using the self-adhesive layer consisting of the reactively curing bituminous mixture on the component respectively requiring to be noise-deadened and/or sound-insulated will allow the thermal stress to which it and/or other adjacent constituents of the dishwasher is/are subjected to be kept low or avoided altogether. In many cases fewer temperature-stable constituents—such as, for instance, one or more plastic walls or parts for the rinsing container and/or door—than hitherto can consequently be used, which can reduce the dishwasher's production costs. It will in particular be possible to faultlessly apply a noise-deadening coating to a plastic component such as, for example, a rinsing-container wall, in particular a rinsing-container base tray, made of plastic, preferably heat-sensitive polypropylene (PP), without subjecting the plastic component to an impermissible thermal stress or deforming or even damaging or destroying it.

Using the adhesive layer consisting of the reactively curing bituminous mixture can be environmentally friendlier than using known cold-bonding adhesives typically containing a volatile solvent that vaporises during curing.

The adhesive layer consisting of the ready, reactively curing bituminous mixture is furthermore extremely long-lived and so in the vast majority of cases can last longer than a dishwasher's usable life.

Establishing a noise-deadening and/or sound-insulating arrangement in the case of which exclusively free-flowing but especially viscous, workable reactive bitumen is applied to the component offers the advantage of a simple, uncomplicated application mode. The time needed to produce the respective domestic appliance, in particular the dishwasher, can as a result be shortened overall. It is in particular rendered possible to apply the reactively cured bituminous mass having a desired shape, contour, and/or thickness, area, etc. to one or more places or regions on a component that require to be noise-deadened. Thus at places on the respective component at which a high degree of noise deadening and/or sound insulating is necessary it is possible, for example, to apply a noise-deadening and/or sound-insulating coating that is thicker than on regions at which less noise deadening and/or sound insulating will suffice or at which it is unnecessary. On the latter places it may even be possible to totally omit the noise-deadening and/or sound-insulating coating.

The noise-deadening and/or sound-insulating arrangement consisting of the applied reactively curing, bituminous mass and a component requiring to be coated can according to an advantageous embodiment variant therein in particular possess virtually homogeneous mechanical and acoustic properties if a noise-deadening and/or sound-insulating layer having a uniform or, as the case may be, constant layer thickness is applied on largely a full-coverage basis to the component respectively requiring to be noise-deadened and/or sound-insulated. That is because the layer consisting of the reactively curing, bituminous mixture has preferably largely homogeneous material properties such as, for example, a uniform density, the same or, as the case may be, a comparable elasticity module, and/or a comparable degree of sound absorption. Detaching of the established noise-deadening and/or sound-insulating layer due in particular to component vibrations and/or temperature variations can moreover largely be avoided also over the longer term thanks to comparable mechanical, and/or chemical, and/or physical properties. What is achieved thereby is especially good durability, particularly adhesive adherence of the noise-deadening and/or sound-insulating layer to the respective component as well as particularly good noise reduction.

According to an advantageous development of the invention, the respective component is a wall section for delimiting a rinsing chamber of a domestic dishwasher. What is understood by a rinsing chamber is a chamber in the dishwasher provided for accommodating items requiring to be washed—in particular crockery—during a rinsing operation, referred to also as a rinsing process. The rinsing chamber is customarily located in a box-shaped rinsing container that can be assembled from a plurality of wall sections. The rinsing container can, for example, include a first wall section embodied as a rinsing-container hood and forming a first side wall, a second side wall, and a cover of the rinsing container so that the rinsing chamber will be delimited on two opposite sides and upwardly. A second wall section of the rinsing container can be embodied as a rear wall and delimit the rinsing chamber on a third side. The rinsing container can furthermore include a third wall section embodied as a base tray, referred to also as a rinsing tray, and delimiting the rinsing chamber downwardly. The rinsing container's remaining side can be able to be closed by means of a movable door that has a fourth wall section that is embodied as an inner door and will delimit the rinsing chamber on the fourth side when the door is closed. Other arrangements of wall sections are, though, also conceivable. The door could, for example, be provided on the top of the rinsing chamber so that it can be filled from above.

The wall sections delimiting the rinsing chamber are embodied usually as being thin-walled. Thus wall thicknesses in, for example, the 0.3-to-2-mm range are customary depending on the specific material used. While a rinsing operation is in progress, the insides of the wall sections are therein subjected to circulating rinsing liquid or spray jets consisting of rinsing liquor so that they will be excited particularly intensely into a vibrating state that can cause undesired noises. The noise produced by the dishwasher can be significantly reduced through at least one inventively embodied noise-deadening and/or sound-insulating coating consisting of a reactively curable bituminous mixture now having been applied to one or more of the wall sections.

The reactively cured bituminous mixture can according to an advantageous development of the invention be laterally delimited by at least one limiting element standing proud of the component. The bituminous mixture can in that way be prevented from flowing away parallel to the component's surface before having fully cured. The component's contact area having the inherently present adhesive layer can, moreover, in that way be enlarged so that the join between the component and respective noise-deadening and/or sound-insulating coating is enabled to take a larger load. It can therein have been provided for the noise-deadening and/or sound-insulating coating to be bordered partially or all round by the at least one proud-standing limiting element. The limiting element can be embodied particularly as a web whose height can exceed that of the noise-deadening and/or sound-insulating coating, as a result of which the noise-deadening and/or sound-insulating coating can be protected at its edge from external influences, for example when the dishwasher is being produced.

According to an expedient development of the invention, the inventively produced noise-deadening and/or sound-insulating coating is applied to a three-dimensionally structured area of the component. The component's contact area having the noise-deadening and/or sound-insulating coating can thereby be further enlarged so that the join between the component and noise-deadening and/or sound-insulating coating is enabled to take an even larger load. The structured area can have a shape in the form of, for example, honeycombs, which will be easy to produce particularly if the component is preferably a plastic part or possibly also a sheet-metal component.

According to an advantageous development of the invention, the structured area has at least one web and/or at least one groove or other kind of depression and/or elevation. They produce a three-dimensionally structured surface and can be simply embodied in particular on moulded parts, in particular plastic injection-moulded parts. Thus mechanical aids such as, for example, depressions and/or elevations are expediently provided on the surface—respectively requiring to be coated with the noise-deadening coating—of the component respectively requiring to be covered. They can in particular be ribs, projections, webs, beads, rollers, slots, undercuts etc. The surface—respectively requiring to be coated with heavy bituminous mass—of the component respectively requiring to be covered thus has, expressed in general terms, a three-dimensionally structured surface.

According to a particularly advantageous development of the invention, the respective component is a plastic part made in particular of polypropylene. The adhesive layer of the reactively curing bituminous mixture is particularly suitable for plastic components because application can take place at lower temperatures than when a hot-melt adhesive is used so that damage to temperature-sensitive plastics can be avoided. When the reactively curable, bituminous mixture is being worked and applied there will in particular be no rise in temperature extending into the range around the deforming or, as the case may be, melting temperature of the plastic component respectively requiring to be noise-deadened and/or sound-insulated. A correspondingly constituted reactively curing bituminous mixture moreover has better adhesion to most plastics, particularly polypropylene, than known hot-melt or cold-bonding adhesives.

According to an expedient development of the invention, the component is a coated, in particular plastic-coated part, made in particular of metal. The adhesive layer consisting of the reactively cured bituminous mixture is likewise particularly suitable for lacquered or otherwise primed or otherwise pre-treated parts because temperature-induced damage to the lacquer, primer, and/or other coating can be avoided here, too, and good adhesion achieved.

According to an expedient development of the invention, the finished component is noise-deadened and/or sound-insulated by means of a layer arrangement formed exclusively by the reactively cured bituminous mixture. The component can thereby be effectively and permanently noise-deadened and/or sound-insulated in a simple manner.

According to an advantageous development of the invention, the respective noise-deadening and/or sound-insulating coating consisting of the reactively curing bituminous mixture has a maximum thickness in the 0.3-to-50-mm, preferably 1.0-to-20-mm, though particularly preferably 1.6-to-6-mm range. Components of the dishwasher can be adequately noise-deadened and/or sound-insulated within the cited ranges with little material being used. The noise-deadening and/or sound-insulating coating can therein have a uniform thickness or a variable thickness.

The respective inventive noise-deadening and/or sound-insulating coating is sufficiently thick within the cited ranges to achieve full-coverage contact between the adhesive layer and the component even if the latter's surface exhibits undesired unevenness and/or desired three-dimensional structuring. A particularly stable arrangement having a particularly good noise-deadening and/or sound-insulating effect is achieved thereby. Excessive use of material will therein simultaneously be avoided.

According to an expedient development of the invention, the respective, self-adhesive noise-deadening and/or sound-insulating coating is produced by preparing a bituminous mixture which in its usable state is free-flowing and curable and applying it to the component before it cures. A usable, free-flowing, and curable bituminous mixture advantageously includes all the constituents necessary for enabling it to be applied in its free-flowing, in particular viscous form to the respective component and cure there. What is made possible thereby is for the noise-deadening and/or sound-insulating coating to be able to be produced by applying material once only. The constituents can moreover be more uniformly mixed compared with solutions in which individual constituents of the bituminous mixture are applied one after the other.

According to an expedient development of the invention, the usable, free-flowing, and curable bituminous mixture is produced by forming a mixture from a first constituent and a second constituent,

- with the first constituent containing a basic bonding agent, a flux oil, and an added reactive agent that are mutually coordinated such that an activator is needed for curing, and with the second constituent containing the activator; or
- with the first constituent containing a basic bonding agent and a flux oil that are mutually coordinated such that an added reactive agent is needed for curing, and with the second constituent containing the added reactive agent; or
- with the first constituent containing a basic bonding agent and a flux oil that are mutually coordinated such that an added reactive agent and an activator are needed for curing, and with the second constituent containing the added reactive agent and the activator.

The usable, free-flowing, and curable bituminous mixture is in that way produced in each case by mixing two constituents that can be stored separately from each other for a prolonged period. The usable, free-flowing, and curable bituminous mixture can therein be produced immediately before being applied to the component by simple mixing of the constituents, as a result of which curing begins. Problems due to premature curing can thus be obviated.

The present invention relates further to a method for producing a domestic appliance, in particular a domestic dishwasher, having at least one noise-deadening and/or sound-insulating coating applied to one or more components for the purpose of noise deadening and/or sound insulating, which method is characterised in that a reactively curing bituminous mixture is produced as the noise-deadening and/or sound-insulating coating and applied to the component respectively requiring to be noise-deadened. The inventive method enables good structure-borne noise insulating (noise deadening) and, where applicable, also airborne noise insulating (sound reflecting) of components, in particular temperature-sensitive components. The production process moreover requires far less energy or even no additional energy for heating the noise-deadening coating than in the case of conventionally applied bitumen mats or bitumen plates or bitumen tracks using hot-melt adhesives.

The reactively curing bituminous mixture can expediently be worked in its free-flowing but particularly fluid though preferably viscous state (at room temperature of around 20° C.). That also includes material states in which the reactively curing mixture forms a malleable mass. The reactively curing mixture's consistency is in its application state selected preferably as having medium to high viscosity and still being malleable, which is to say not yet cured. The reactively curable mixture's viscosity is in its application state expediently between $10^2$ and $10^6$ Pa sec.

The inventive method will thus enable an inventive dishwasher to be produced simply, quickly, and safely.

The invention relates also to a device for producing a dishwasher having at least one component that is provided with at least one noise-deadening and/or sound-insulating coating for noise deadening and/or sound insulating the component, according in particular to the aforementioned method.

It is expediently provided in the inventive device for means to be furnished for applying a reactively curable bituminous mixture to the respective component.

The means for applying a reactively curable bituminous mixture to the component can include in particular a spraying device for spraying the reactively curable bituminous mixture onto the respective component. It is for that purpose expedient for the reactively curable bituminous mixture to be fluid in its working, which is to say application state. A uniform application can be ensured thereby.

In particular a nozzle device or extrusion-moulding device can be advantageous for applying the reactively curable bituminous mixture to the respective component in a string-like or linear manner. It is for that purpose expedient for the bituminous mixture in its ready-to-use state, which is to say ready for applying to the component requiring to be covered, to be free-flowing but especially viscous or at least malleable. The bituminous mixture can as a result be applied to the respective component's respective application area in its non-cured state in the form of lanes, beads, cords, or blobs. Those can be applied preferably, for example, linearly or in meandering fashion.

Alternatively or additionally to using a spraying device for a sprayed application or a nozzle device for a jetwash application, means such as, for example, rollers, brushes, or spatulas for spreading free-flowing bituminous mixture onto the component can, where applicable, also be expedient.

The applicator can in particular be fully automated and controlled by, for example, an industrial computer.

The inventive device will enable the inventive method to be implemented simply, quickly, and safely.

The advantageous developments of the invention that are presented in the dependent claims and/or were explained above can be provided individually or in any combination.

BRIEF DESCRIPTION OF THE DRAWINGS

The invention and its developments as well as the advantages associated therewith are explained in more detail below with the aid of schematics, in which.

DETAILED DESCRIPTION OF EXEMPLARY EMBODIMENTS OF THE PRESENT INVENTION

Figure 1:
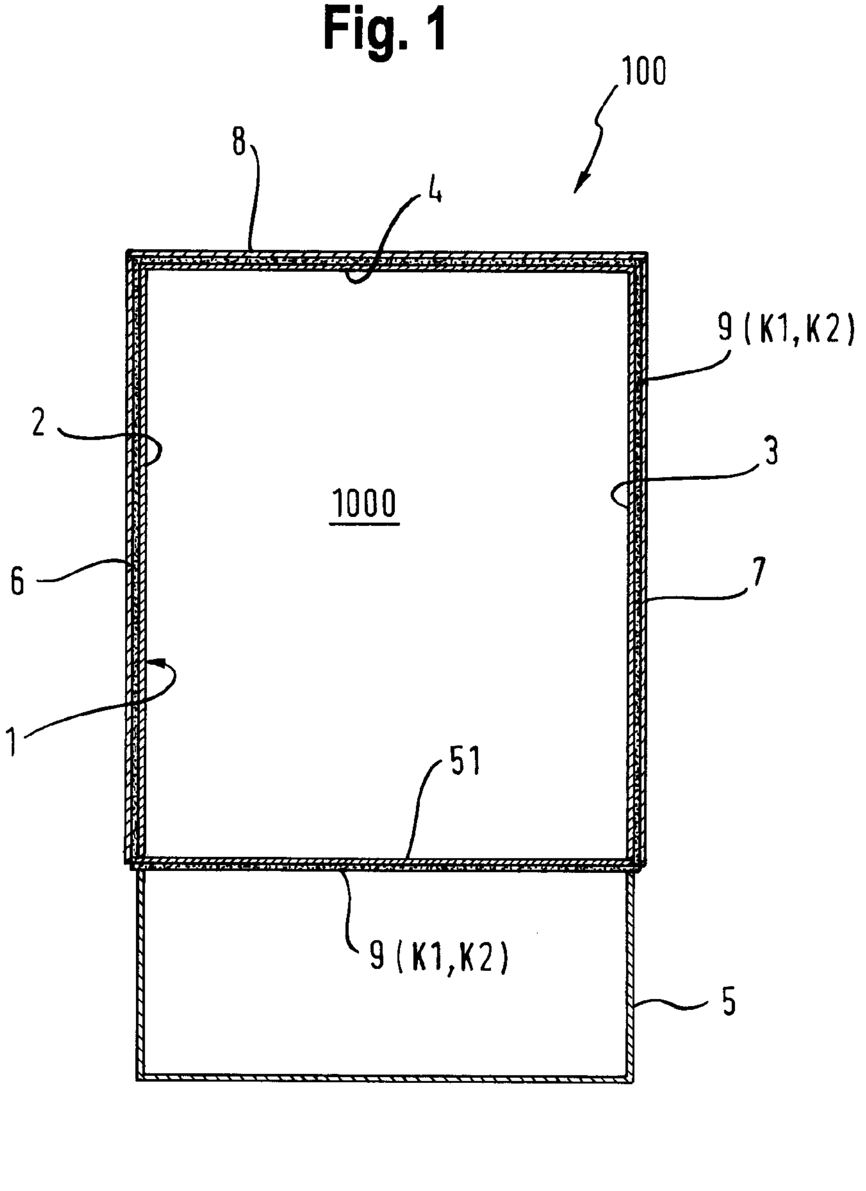
FIG. 1 is a sectional view of an inventively embodied domestic dishwasher according to a first advantageous embodiment variant.

Mutually corresponding parts have been assigned the same reference numerals/letters in the following figures. A dishwasher's only constituents to have been assigned reference numerals/letters and explained are those necessary for understanding the invention. It is obvious that the inventive dishwasher can include other parts and modules.

FIG. 1 is a sectional view of a dishwasher 100 according to a first embodiment variant. Dishwasher 100 includes a box-shaped rinsing container 1 having rinsing-container walls 2, 3, 4 and a base tray 51 made of plastic. Rinsing container 1 is attached to a base or base module 5. Top rinsing-container wall or, as the case may be, cover wall 4 and lateral rinsing-container walls 2, 3 are made of, for example, solid plastic, in particular lacquered polypropylene (PP), and have a partial or full outer covering consisting of metal sheets 6, 7, 8 and a noise-deadening coating and/or sound-insulating layer 9 provided between metal sheets 6, 7, 8 and rinsing-container walls 2, 3, 4 and also on the underside of base tray 51 of rinsing container 1. The entire rinsing container 1 is thereby encapsulated all round by the noise-deadening and/or sound-insulating coating. Outer metal sheets 6, 7, 8 may possibly be partially or entirely omitted, which can be expedient in the case particularly of built-in dishwashers. Noise-deadening and/or sound-insulating coating 9 has here in the exemplary embodiment been precisely matched to the shape of box-shaped rinsing container 1. Noise-deadening and/or sound-insulating coating 9 consists of a reactively cured bituminous mixture and contains two constituents. A first constituent K1 is a liquid constituent with bitumen and oil and/or resin, consisting preferably of renewable raw materials. Added thereto is at least one solid constituent, preferably having at least one mineral constituent such as, for example, rock meal, Solnhofen cement, white fine lime, etc. Said constituents can be preferably ready mixed for being worked, which is to say before being applied to the exterior surfaces of the various walls 2, 3, 4, 51 of rinsing container 1, and made available as a ready-to-use mixture in a first container. A hardener or, as the case may be, activator such as, for example, water is kept as a second constituent K2 in a second, separate container. Before being applied, said two constituents K1, K2 are fed to a mixer (see 19 in FIG. 3), mixed together there, and finally applied via a nozzle (see 20 in FIG. 3) to rinsing-container walls 2, 3, 4 and to the underside of base tray 51 by spraying. Mixing of the reactively curable bituminous mixture and applying it to said components 2, 3, 4, 51 can take place at room temperature. Adding the hardener (second constituent K2) will trigger cross-linking within first constituent K1 so that total bituminous mixture 9 will reactively cure from constituents K1, K2.

Thus here in the exemplary embodiment, non-cured bituminous mixture 9 is in each case applied to the entire exterior surface of respective rinsing-container wall 2, 3, 4 and rinsing-container base 51 and will rest thereon externally on a largely full-coverage basis. The outer surface of the inner wall or, as the case may be, inner door of the front door (not shown here in FIG. 1) of dishwasher 100, which is to say the surface facing away from rinsing chamber 1000 of rinsing container 100, can also be coated or, as the case may be, covered with a reactively curing bituminous mass of such kind. It is in that way possible to advantageously ensure complete encapsulating of rinsing container 1, which encapsulating is embodied as being particularly well sound-insulated and noise-deadened.

It can, where applicable, of course also be adequate for only a partial area of the rinsing container's respective side wall such as, for example, 2, 3, of the rinsing container's rear wall (omitted from FIG. 1), and/or of the rinsing-container's base 51, or only a partial number of the rinsing container's walls to be coated with the non-cured bituminous mass. Thus it can be expedient, for example, for only the base tray 51 to be coated on its underside and/or the front door's inner wall to be coated on its exterior side with the non-cured reactive bitumen. The coating of base tray 51 on the underside can in particular be expedient in the case of dishwashers where the rinsing container's base tray is made of plastic, preferably polypropylene, and the other walls of the rinsing container and/or its door are made of metal such as, for example, high-grade steel.

Figure 2:
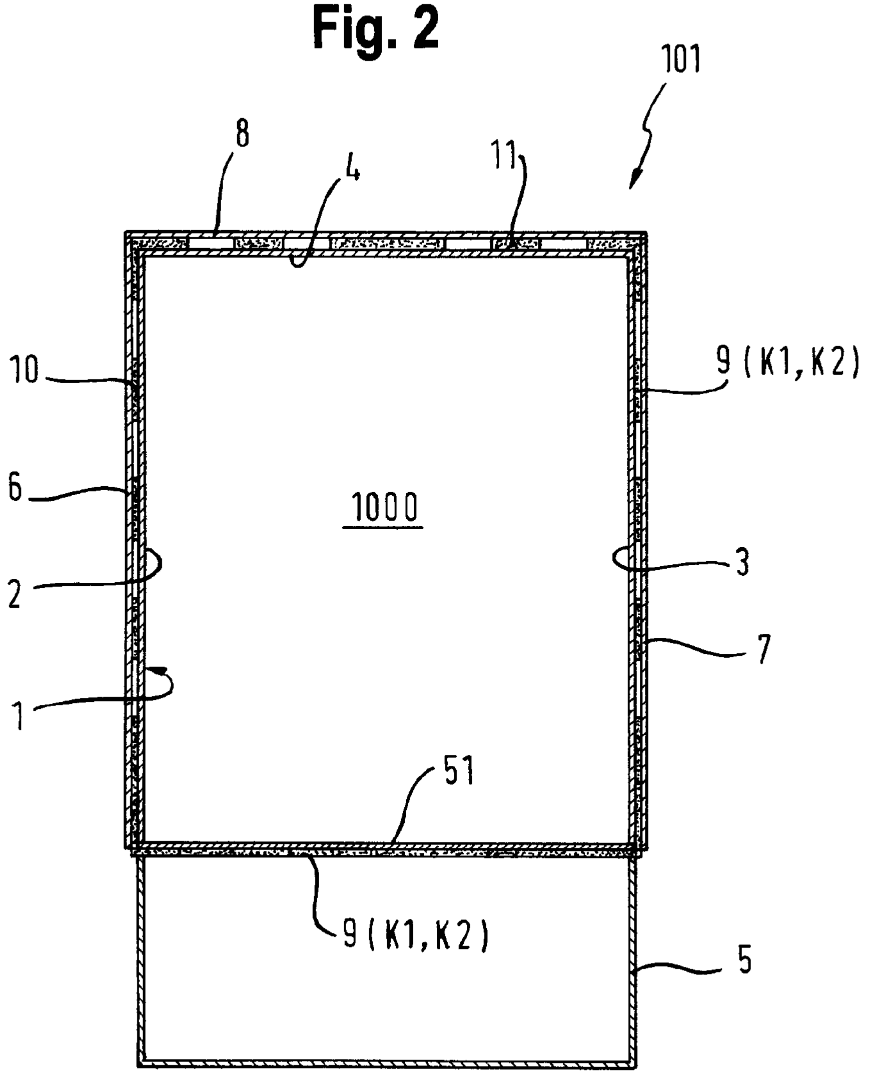
FIG. 2 is a sectional view of an inventively embodied dishwasher according to a second advantageous embodiment variant.

FIG. 2 is a sectional view of a dishwasher 101 according to a second embodiment variant. Dishwasher 101 according to the second embodiment variant differs from dishwasher 100 according to the first embodiment variant in its noise-deadening and/or sound-insulating coating 9. It does not have a constant thickness but, instead, a plurality of non-contiguous regions 10, 11 of differing thickness. Said different regions 10, 11 can be obtained by, for example, spraying the mixture onto the individual regions for different lengths of time.

There will be no negative impact on the carbon dioxide balance when the reactive bitumen is thermally recycled if a part thereof is advantageously replaced with a renewable raw-material constituent. There will furthermore be a saving in resources. The described method, which can be implemented at a temperature in the range around room temperature, will not cause plastic components, in particular untreated PP plastic components such as, for example, plastic-base tray 51 of rinsing container 1, to be subjected to an impermissible thermal stress, in particular to be damaged or even destroyed. Thus temperature-sensitive components, for example ones made of plastic or given plastic, primer, and/or lacquer coatings, can also be coated with the described bituminous mixture to establish a noise-deadening or, as the case may be, sound-insulating layer without damaging the components.

The ready-to-use mass made of the bituminous mixture is particularly suitable as a noise-deadening and/or sound-insulating covering for vibrating constituents or, as the case may be, vibrating components. The noise-deadening and/or sound-insulating coverings can be worked and produced very quickly thanks to a very short evaluation time that is possible. Particularly through the addition of specific hardeners and, where applicable, the concentration thereof, the reaction time of the reactively curable, bituminous mixture can therein expediently be set such that the bituminous mixture applied in a free-flowing but especially viscous state will largely be prevented from running or, as the case may be, dripping off at vertical or inclined areas of application. For example a mixing unit (see 19 in FIG. 3) having a downstream robot-controlled applicator nozzle (see 20 in FIG. 3) can be used for applying the reactively curable bituminous mixture. An advantage thereof is the possibility of coating partial regions of the areas on the components requiring to be insulated with the noise-deadening and/or sound-insulating layer. In contrast to prefabricated bitumen mats it is possible moreover to individually implement different layer thicknesses, contours, areas, and/or shapes of the one or more noise-deadening and/or sound-insulating coverings in the respective component's one or more different application regions. An application region can in particular be coated, particularly sprayed, with the reactively curable bituminous mixture to different thicknesses. The respective component can, where applicable, also be totally enclosed by the reactively curable bituminous mixture, which is difficult or even impossible to achieve using prefabricated bitumen mats. The noise-deadening and/or sound-insulating coating which by means of the bituminous mass flowing freely in its application state can in that way be matched to the respective noise-deadening and/or sound-insulating situation on a locally specific basis and/or in an individualised manner not only offers an energy-saving advantage during the production process but will also reduce the domestic appliance's energy consumption, in the case particularly of a dishwasher.

Structure-borne noise insulating of temperature-sensitive components such as, for example, plastic components and lacquered and/or primed components can be achieved in a simple manner with the aid of the described noise-deadening and/or sound-insulating coating. Airborne noise insulating of temperature-sensitive components such as, for example, lacquered components or plastic components can also be provided. The partial insulating option, which is to say applying the noise-deadening and/or sound-insulating coating only to selected areas and/or with different layer thicknesses, shapes, and/or contours makes it in particular possible to selectively coat regions of the components or places thereon that are relevant in terms of vibration and thereby provide them with better noise deadening and/or sound insulating. Instead of applying a bitumen mat having a constant layer thickness, the free-flowing but especially viscous application state of the bituminous mixture that can be reactively cured after a hardener has been added will allow said mixture to be selectively applied, in particular sprayed, onto individual places on the component respectively requiring to be noise-deadened and/or sound-insulated that are in greater need of noise deadening and/or sound insulating than other places on the component.

Applying the noise-deadening and/or sound-insulating coating at a temperature in the range around room temperature, preferably around 20° Celsius, made possible by the novel reactive-bitumen mass will enable energy to be saved compared with the method known hitherto for melting prefabricated bitumen mats. The noise-deadening and/or sound-insulating coating can be applied having precisely the necessary layer thickness thanks to the described method so that the amount of noise-deadening and/or sound-insulating coating material required can be minimised. Owing to the matched layer thickness, contour, or shape and/or the matched area of the respective noise-deadening and/or sound-insulating coating, less mass, which is to say a lesser mass overall of noise-deadening and/or sound-insulating coating, will need to be heated while the domestic appliance is in operation. The domestic appliance's energy consumption will be reduced thereby. That is advantageous particularly when a dishwasher is used because using the reactively curable bituminous mixture will enable the mass of heavy material present to be reduced compared with the instance in which conventional, uniformly thick, and prefabricated bitumen mats have been positioned on the outer walls of the rinsing container or put into its door. The energy consumed during each individual rinsing operation will thereby be able to heat less of a mass of heavy material present than in the instance in which conventional, uniformly thick bitumen mats have been applied to the rinsing container's, base tray's, and door's walls which, with reference to rinsing chamber 1000, are externally located.

Figure 3:
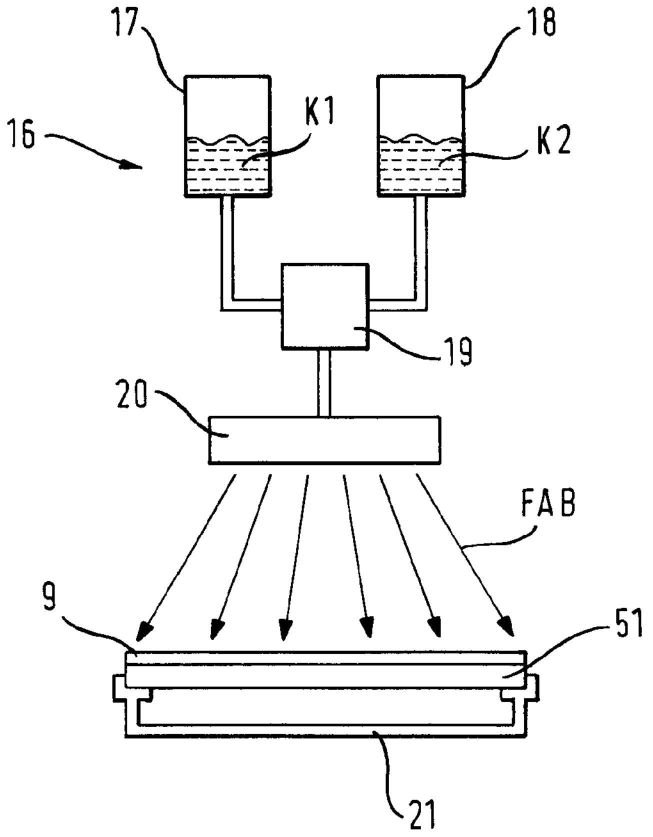
FIG. 3 is a representation illustrating a method and device for producing the dishwasher shown in FIGS. 1 and 2.

FIG. 3 is an exemplary representation illustrating a method and device for producing an inventively embodied dishwasher.

According to an advantageous embodiment variant, it is provided for the reactively curable bituminous mixture to be applied as a noise-deadening and/or sound-insulating coating only to the underside of a plastic base tray 51 owing to said mixture's self-adhesive properties. The other wall sections such as, for example, 2, 3, 4 of the rinsing container of the dishwasher and/or its front door (not visible in FIGS. 1, 2) are, as a variation to what is shown in FIGS. 1, 2, made in this exemplary embodiment preferably of a metallic material such as, for example, high-grade steel.

The inventive applicator for this purpose includes means 16 for applying a reactively curable bituminous mixture FAB to the underside of plastic-base tray 51 of rinsing container 1. The reactively curable mixture is therein free-flowing in its ready-to-use state.

Means 16 for applying a ready-to-use, free-flowing, and reactively curable bituminous mixture FAB include in the exemplary embodiment a first container 17 for accommodating a first storable constituent K1 of the reactively curable bituminous mixture and a second container 18 for accommodating a second storable constituent K2 of the reactively curable bituminous mixture.

The first constituent K1 can therein contain a basic bonding agent, a flux oil, and an added reactive agent that are in particular mutually coordinated such that an activator is needed for curing, with the second constituent K2 containing the activator.

The first constituent K1 can expediently alternatively contain a basic bonding agent and a flux oil that are mutually coordinated such that an added reactive agent is needed for curing, with the second constituent K2 containing the added reactive agent.

According to another advantageous alternative, the first constituent K1 can contain a basic bonding agent and a flux oil that are mutually coordinated such that an added reactive agent and an activator are needed for curing, with the second constituent K2 containing the added reactive agent and the activator.

In all the cited instances it is now possible to produce a usable, free-flowing, and curable bituminous mixture FAB by mixing the first constituent K1 and second constituent K2. A usable, free-flowing, and curable bituminous mixture FAB includes all the constituents needed to be able to be applied to the underside of base tray 51 in a free-flowing and where applicable viscous form and to cure with a solid noise-deadening and/or sound-insulating coating 9 being formed in the process. Noise-deadening and/or sound-insulating coating 9 can thereby be produced by applying bituminous-mixture material once only.

The inventive device therein has a mixer 19 for mixing the first constituent K1 and second constituent K2, which mixer is joined to first container 17 such that first constituent K1 can be fed to it and to second container 18 such that second constituent K2 can likewise be fed to it. Thus produced usable, free-flowing, and reactively curable bituminous mixture FAB can then be fed to an applicator, in particular a spraying device 20, for applying, in particular spraying, free-flowing bituminous mixture FAB onto the underside exterior surface of base tray 51 that has been turned round. For being coated with said adhesive, reactively curable bitumen mixture FAB, the base tray or, as the case may be, the base support part with the base tray is therein expediently turned round about 180° relative to its subsequent mounting position in the ready assembled dishwasher so that the underside of the base tray is now on top for being coated. Spraying device 20 can have at least one nozzle (not shown) for applying, in particular spraying usable, free-flowing, and curable bituminous mixture FAB onto the base tray. An application that is capable of being locally individualised and is in particular, of course, uniform can be ensured thereby. What, though, is also conceivable are means for coating base tray 51 with free-flowing bituminous mixture FAB such as, for example, rollers, brushes, or spatulas. It can in particular also be expedient for in each case one or more strings or beads of bituminous material to be applied to the underside of base tray 51, which side is on top during the coating process. An extrusion-moulding method can in particular be used therefor.

Base tray 51 requiring to be coated can be fed to or, as the case may be, placed before spraying device 20 by a handling means 21. Said tray can in particular be a constituent of a base module 5 made particularly of plastic.

The applicator can in particular be fully automated and controlled by, for example, an industrial computer.

Figure 4:
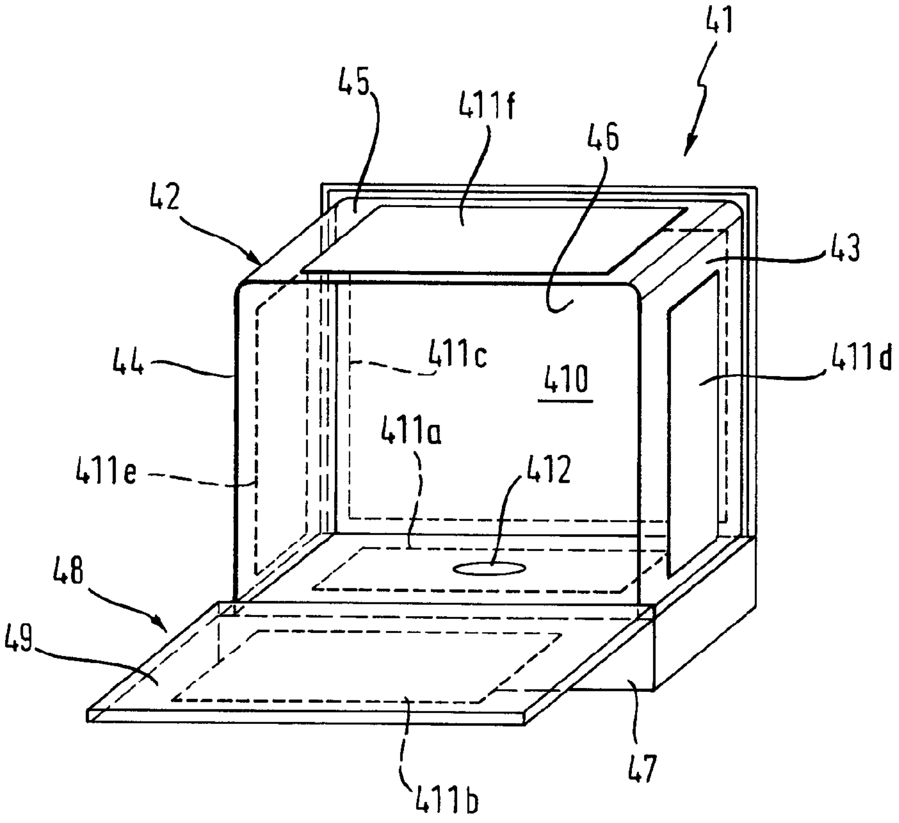
FIG. 4 shows a variation of what is shown in FIG. 1 as a perspective schematic of another advantageous exemplary embodiment of an inventively embodied dishwasher.

FIG. 4 shows a variation of what is shown in FIG. 1 as a perspective schematic of a box-shaped rinsing container 41 of another exemplary embodiment of an inventive dishwasher 41. Rinsing container 41 includes a first, U-shaped wall section 42 forming a first side wall 43, a second side wall 44, and a cover 45 of box-shaped rinsing container 41. A first wall section 42 of such kind is referred to also as a rinsing-container hood. A second wall section 46 of rinsing container 41 is embodied as a rear wall. Rinsing container 41 likewise has a base tray as a third wall section 47. Rinsing-container hood 42 and rear wall 46 are each embodied as a stamped-and-bent part made of a metallic material, in particular high-grade steel sheeting. Base tray 47 is in contrast an injection-moulded part made of plastic, particularly polypropylene, embodied having in particular a three-dimensional structure. The base tray can preferably be by a cover constituent of a base module or base support located underneath U-shaped rinsing-container hood 42.

To be able to close an open side of rinsing container 41, said container is assigned a movable door 48 having as a fourth wall section 49 an inner door that can likewise be a stamped-and-bent part made of high-grade steel sheeting. Door 48 shown in FIG. 1 in an open position can be swiveled into a closed position to produce a closed rinsing chamber 410 in which items, for example crockery, requiring to be washed can be cleaned by being subjected to a rinsing liquid. Rinsing chamber 410 is therein delimited by the interior sides of wall sections 42, 46, 47, 49 so that an uncontrolled exiting of rinsing liquid will be obviated. The arrangement of wall sections 42, 46, 47, 49 is therein exemplary, with other arrangements of wall sections also being conceivable. For example a door could be provided on the top of rinsing chamber 410 so that rinsing chamber 410 can be filled from above. Rinsing chamber 410 could also be located in a rinsing container embodied as a drawer that can be pulled out.

The interior sides of wall sections 42, 46, 47, 49 delimiting the rinsing container are during a rinsing operation subjected to circulating rinsing liquid, in particular spray jets from spray nozzles, from rinsing devices such as, for example, rotating spray arms, located inside the rinsing container so that said sections can each be excited into a vibrating state that can cause undesired noises. It is, though, also possible for vibrating of such kind to be produced additionally or independently thereof by actuators (not shown) of the dishwasher such as, for example, pumps and blowers and suchlike. Any noise that is produced can be particularly loud because wall sections 42, 46, 47, 49 are embodied expediently as being thin-walled.

To now prevent or at least reduce the production of annoying noise, it is provided for wall sections 42, 46, 47, 49 to be noise-deadened and/or sound-insulated by means of noise-deadening and/or sound-insulating coatings 411*a*-411*f* consisting of a reactively curable bituminous mixture.

Noise-deadening and/or sound-insulating coatings 411*a*-411*f* are application layers or material accumulations produced using a bonding agent made of bitumen, also called mineral pitch, or from bitumen-like bonding agents such as, for example, polymeric bitumen, tars, pitches, and/or distillation residues of fats and oils. The term “application layer” therein means that the respective noise-deadening and/or sound-insulating layer 411*a*-411*f* is specific to the component for which it is intended, being thus in this case specifically matched to wall sections 42, 46, 47, 49, and so unlike a prefabricated bitumen mat is applied adhesively to the respective component 2, 6, 7, 9 in a free-flowing but especially viscous and hence workable, soft intermediate state. Layer thickness, contour, application area, geometric shape, and/or other application parameters are therein advantageously largely freely selectable for the respective noise-deadening and/or sound-insulating coating formed by the free-flowing, reactively curable bituminous mixture and can consequently be accommodated to the respectively specifically prevailing circumstances.

Wall sections 42, 46, 47, 49 are now noise-deadened and/or sound-insulated particularly by applying the reactively curable bituminous mass in each case to typically thin-walled wall section 42, 46, 47, 49 respectively requiring to be noise-deadened and/or sound-insulated by means of bituminous noise-deadening and/or sound-insulating coatings 411*a*-411*f* so that the frequencies of the vibrations that occur will be reduced in magnitude and the resulting noises consequently be less annoying. At least a part of the vibration energy can moreover be converted into heat through internal friction in bituminous noise-deadening and/or sound-insulating coatings 411*a*-411*f* so that the noises produced will reduce in intensity. Bituminous noise-deadening and/or sound-insulating coatings 411*a*-411*f* are expediently applied to surfaces of wall sections 42, 46, 47, 49 pointing away from the rinsing chamber so that they will not be subjected to rinsing liquid.

Provided in the exemplary embodiment is a first bituminous noise-deadening and/or sound-insulating coating 411*a* for noise deadening and/or sound insulating base tray 47. First bituminous noise-deadening and/or sound-insulating coating 411*a* has by way of example a rectangular outline and an in particular approximately circular opening 412 for a pump body (not shown to maintain the drawing’s clarity) of the dishwasher. A second rectangular bituminous noise-deadening and/or sound-insulating coating 411*b* is provided for noise deadening and/or sound insulating inner door 49 and a third rectangular bituminous noise-deadening and/or sound-insulating coating 411*c* is provided for noise deadening and/or sound insulating rear wall 46. Rinsing-container hood 42 is noise-deadened and/or sound-insulated by means of a fourth bituminous noise-deadening and/or sound-insulating coating 411*d* located in the region of first side wall 43, by means of a fifth bituminous noise-deadening and/or sound-insulating coating 411*e* located in the region of second side wall 44, and by means of a sixth bituminous noise-deadening and/or sound-insulating coating 411*f* located in the region of cover 45. The respective bituminous noise-deadening and/or sound-insulating coating therein in each case sticks into position on the outer surface facing away from rinsing-chamber interior 410 of rinsing container 41, which is to say on the side facing away from the rinsing container’s interior, on the respective rinsing-container wall, and/or on inner door 49 over the entire area owing to the material’s inherent adhesive forces.

It can in particular be expedient for a noise-deadening and/or sound-insulating coating 411*a* consisting of the reactively curable bituminous mixture to be adhesively applied only to the underside of base tray 47 and for the noise-deadening and/or sound-insulating coatings on the other, metallic wall sections of rinsing container 41 to be omitted. That will be advantageous particularly if base tray 47 is made of plastic, particularly polypropylene. It may therein suffice for only an annular region around opening 412 provided roughly centrally in base tray 47 to be coated on the underside thereof with the reactively curable bituminous mixture, and for the rest of the base tray’s underside area to remain uncovered or, as the case may be, uncoated. Base tray 47 can thereby be noise-deadened and/or sound-insulated efficiently in material terms. Expressed in general terms, the free-flowing but especially viscous, reactively curable bituminous mixture will thus in each case be applied only at the specific location on a component requiring to be noise-deadened and/or sound-insulated that is more vibration-prone than other regions thereon. It can in particular also be expedient for the layer thickness of the reactively curable mixture to be selected as being thicker on the respective component’s specific zones more inclined to oscillate or vibrate or simply requiring more intensive sound-insulating than at the respective component’s specific locations that are less noisy or subjected less to sound waves.

Figure 5:
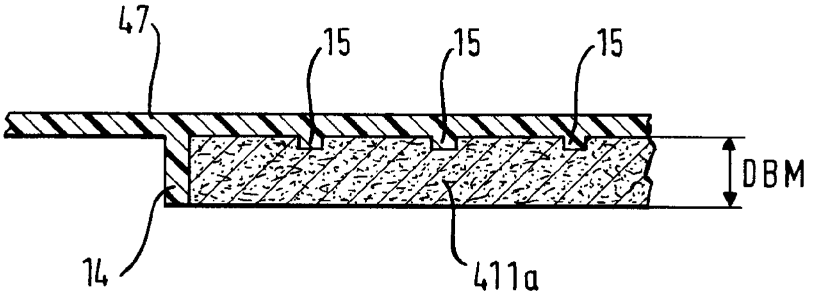
FIG. 5 is a more detailed partial representation of the dishwasher shown in FIG. 4, with a part of a base tray of the rinsing container and a part of a self-adhesive noise-deadening and/or sound-insulating coating being shown.

FIG. 5 is a more detailed exemplary partial representation of the dishwasher shown in FIG. 4, with a part of base tray 47 of rinsing container 41 and a part of a self-adhesive noise-deadening and/or sound-insulating coating 411*a* applied using the self-adhesive, reactively curable bituminous mass being shown. The following explanations for producing and applying the noise-deadening and/or sound-insulating coating or, as the case may be, layer 411*a* to the underside of base tray 47 apply analogously also to the possible application of noise-deadening and/or sound-insulating coatings 411*b*-411*f* to the other components 42, 46, 49 requiring to be noise-deadened and/or sound-insulated.

The noise-deadening and/or sound-insulating coating 411*a* is inventively formed from a reactively cured bituminous mixture. The cited base tray is made in this case of plastic, in particular polypropylene (PP).

Reactively curable bituminous mixtures therein include in particular at least one basic bonding agent made of bitumen, also called mineral pitch, or of bitumen-like bonding agents, which at a scheduled working temperature has such a high viscosity as to behave virtually like a solid.

So that the bituminous mixture can now be formed into a heavy self-adhesive layer, it contains in particular at least one flux that will lower the mixture's viscosity sufficiently for it to be free-flowing at its scheduled working temperature, meaning that it will behave like a liquid or in particular a viscous, sluggish, or mushy or, as the case may be, paste-like mass. Fluxes are therein solvents that are not easily volatilised and which will remain in the bituminous mixture even after it has cured, meaning they will not vaporise.

In order now to allow the bituminous mixture to cure after the respective noise-deadening and/or sound-insulating layer has been formed, at least one reactive agent for producing an in particular physical and/or chemical effect increasing the viscosity of the mixture is expediently added to it before the noise-deadening and/or sound-insulating layer is formed. The added reactive agent's effect can therein be triggered by it automatically or by adding at least one activator.

Possibly interacting with the activator, the added reactive agent can in particular cancel the effect of the flux preferably irreversibly, for example though cross-linking or precipitating or by bonding to the basic bonding agent.

Noise-deadening and/or sound-insulating layer 411*a* is expediently laterally delimited by at least one limiting element 14 standing proud on the underside of base tray 47, which is to say on the side thereof facing away from rinsing-chamber interior 410. The bituminous mixture can in that way be prevented from flowing away parallel to the exterior surface of base tray 47 before having fully cured. Base tray 47 is preferably turned round for coating, which is to say its underside will then be on top. The common contact area of base tray 47 and noise-deadening and/or sound-insulating layer 411*a* can moreover be enlarged by means of limiting element 14 so that the join between base tray 47 and noise-deadening and/or sound-insulating layer 411*a* will be enabled to take a larger load. It can therein have been provided for noise-deadening and/or sound-insulating layer 411*a* to be bordered partially or all round by the at least one proud-standing limiting element 14. Limiting element 14 can be embodied particularly as a web whose height can exceed that of noise-deadening and/or sound-insulating layer 411*a*, as a result of which said layer can be protected at its edge from external influences, for example when the dishwasher is being produced.

Noise-deadening and/or sound-insulating layer 411*a* has expediently been stuck onto a three-dimensionally structured area of base tray 47. The contact area of base tray 47 having the noise-deadening and/or sound-insulating layer 411*a* can thereby be further enlarged so that the join between base tray 47 and noise-deadening and/or sound-insulating layer 411*a* is enabled to take an even larger load.

The structured area therein has webs 15 in the exemplary embodiment. Webs 15 cause the surface of the component respectively requiring to be noise-deadened and/or sound-insulated to have a three-dimensional structure, as in this case on the underside of base tray 47, and can be embodied simply in particular on injection-moulded parts such as, for example, base tray 47. One or more grooves could alternatively also be provided for structuring the surface. Expressed in general terms, one or more depressions and/or elevations can thus expediently be provided on the respective component's surface requiring to be covered with one or more bitumen layers, such as in this case the base tray's underside.

Because base tray 47 is a plastic part made particularly of polypropylene, the reactively cured bituminous mixture's adhesion to plastic can be utilised to establish a particularly stable join between base tray 47 and the inventively produced noise-deadening coating or, as the case may be, noise-deadening layer such as, for example, 411*a*. Adhesive layer 13 consisting of the reactively cured bituminous mixture is particularly suitable for base tray 47 made of plastic because noise-deadening and/or sound-insulating coating 411*a* can be applied and adhere at temperatures that are lower than when a hot-melt adhesive is used and in particular lower than the deforming or even melting temperature of the base tray's plastic component so that temperature-induced deforming or damaging of the base tray's plastic can be avoided.

Base tray 47 is advantageously noise-deadened and/or sound-insulated by a layer arrangement applied to its outer surface and formed exclusively by a material accumulation of the reactively curable bituminous mixture. Base tray 47 can thereby be effectively and permanently noise-deadened and/or sound-insulated in a simple manner. It would, though, basically be possible to arrange a plurality of bituminous material layers such as, for example, 411*a*, in a stacked manner or, as the case may be, layered one upon the other externally on the base tray's underside surface. A noise-deadening and/or sound-insulating coating can, where applicable, additionally or independently thereof in the same way also be stuck particularly on a full-coverage basis over the inner door's entire outer surface and/or the rinsing container's other walls using a reactively curable bituminous mixture ("reactive bitumen"). The reactively curable bituminous mixture will therein function as a heavy self-adhesive layer externally on the component respectively requiring to be noise-deadened and/or sound-insulated.

The respective noise-deadening and/or sound-insulating coating such as, for example, 411*a* preferably has a maximum thickness DBM in the 0.8-mm-to-50-mm, preferably 1.0-mm-to-20-mm, though particularly preferably 1.6-mm-to-6-mm range. The dishwasher's base tray 7 can be adequately noise-deadened and/or sound-insulated within the cited ranges with little material being used. The respective noise-deadening and/or sound-insulating coating can, as shown, therein have a uniform thickness but a variable one if required.

The respective noise-deadening and/or sound-insulating coating consisting of reactively curable bituminous material is in particular selected as being sufficiently thick to be able to ensure full-coverage contact between the noise-deadening and/or sound-insulating coating and the respective component such as, for example, base tray 47 even if the latter's surface exhibits undesired unevenness and/or desired three-dimensional structuring. A particularly stable arrangement having a particularly good noise-deadening and/or sound-insulating effect is achieved thereby. Excessive use of material will simultaneously be avoided therein.

The invention is characterised inter alia in particular also in that reactive bitumen is surprisingly suitable as a thick adhesive layer on components, in particular plastic components such as, for instance, those belonging to a dishwasher. In many instances no pre-treating of the component respectively requiring to be noise-deadened and/or sound-insulated such as, for example, flame-treating or plasmatising etc. is therein necessary. Besides exhibiting that inherent pressure-sensitive adhesive effect, the reactive bitumen also has very good sound-insulating and/or damping properties for reducing vibrations, which satisfies the aim of reducing noise. The application can in particular advantageously be performed mechanically using a two-component method.

The adhesive join's contact areas can be enlarged by providing elevations such as, for example, ribs and/or depressions such as, for instance, slots or grooves.

The following advantages in particular can be obtained:

a. Very good adhesion to polypropylene, b. No pre-treating required, c. Very good sound-insulating and/or damping properties for reducing vibrations, d. Mechanical reactive-bitumen application possible, e. Additional areas of adhesion, f. Possible additional mechanical securing can be integrated.

By means of the respectively applied, reactive bituminous mixture, which is to say the "reactive bitumen", it is in particular possible to form a thick layer with the aid of which any unevenness on the component requiring to be covered with the bitumen layer or, as the case may be, coating can advantageously be evened out so that largely full-coverage adhesion of the bitumen layer to the respective component's surface requiring to be covered will have been ensured. In particular the thus applied reactive bitumen layer or plurality of thus applied bitumen layers can function also as a means of adhesion for one or more, already prefabricated bitumen mats for sticking them on the respective component.

Summarising, in particular the following points are to be considered:

What is demanded or, as the case may be, desired is the application of an energy-saving noise-deadening covering (in particular for airborne noise insulating and/or structure-borne noise insulating) on plastic components or temperature-sensitive components. That is because synthetic materials are increasingly replacing metallic components owing to the technological advances being made in the area of plastics. The acoustic optimising of plastics has hitherto only been possible to a very limited extent. Metal components have hitherto been noise-deadened by applying a damping layer in the form of bitumen mats. These foils or, as the case may be, mats are stuck to the metal surface customarily by means of a hot-melt adhesive. That is not readily possible with plastics as they are heat-sensitive.

Owing to plastic components' low surface tension, acoustic masses cannot in the presence of stresses (such as, for example, temperature stress, mechanical loading) be permanently adhesively joined without the surface's having been treated. An adhesive join provided by activating a hot-melt adhesive by supplying heat to it can lead to the release of internal, frozen tensions in the plastic component. That will result in dimensional deviations and hence to the component's rejection.

Metal components have hitherto been subjected to structure-borne noise insulating—noise deadening—by applying prefabricated polymer-modified bitumen mats. In mass production, these are generally applied using hot-melt adhesion methods. The adhesive layer is therein activated by supplying external energy to it. The acoustic mats can hence be both applied and stuck into position fully automatically. Bitumen mats have a constant material thickness, however, which does not permit optimised damping at oscillation maxima.

Instead of prefabricated bitumen mats, "reactive bitumen" is according to the inventive production and application principle now applied as a ready-to-use mass, created as a result of a two- or more-constituent reaction after a liquid and solid constituent are added and mixed at room temperature, to the places relevant to noise-deadening. The reactive bitumen has in particular the following constituents:

1. Liquid constituent: Bitumen mixture, having in particular at least one renewable raw-material constituent;

2. Solid constituent: One or more mineral fillers.

The liquid constituent consists preferably of bitumen. A part of the bitumen (hydrocarbons) can in particular have been replaced by at least one renewable raw-material constituent. Less carbon dioxide will as a result be released when the reactive bitumen is thermally recycled. There will furthermore be a saving in resources.

It has hitherto not been technically possible to acoustically coat untreated PP plastic components using the hot-melt method owing to the excessively high temperatures. The plastic components will be neither damaged nor destroyed owing to the application of reactive bitumen material at room temperature. Other temperature-sensitive components (such as, for example, plastic coatings or lacquers) can also be noise-deadened with that mass without being damaged.

The reactive bituminous ready-to-use mass can be used likewise as a noise-deadening covering for vibrating components. A novel application method has been developed owing to the very short curing time. It advantageously employs a mixing unit having a downstream robot-controlled application nozzle. An advantage of said application is a partial coverage of the areas respectively requiring to be damped. In contrast to prefabricated bitumen mats it is also possible to realise different layer thicknesses, contours, and/or shapes, etc. . . . . That is attended by not only a manufacturing-related but also an energy-related advantage during the production process. The energy consumption of the finished product (for example of fully automatic dishwashers) can also be reduced.

The inventively applied and embodied noise-deadening coating can in particular bring the following advantages:

a. Structure-borne noise insulating of temperature-sensitive components (such as, for instance, lacquered components, etc.);

b. Structure-borne noise insulating of plastic components;

c. Airborne noise insulating of temperature-sensitive components (such as, for instance, lacquered components, etc.);

d. Airborne noise insulating of plastic components;

e. Possibility of partial damping, which is to say only selected areas are covered with acoustic material; that will enable better noise-deadening of places relevant to vibration with less material being used;

f. Different layer thicknesses, contours, and/or shapes can be applied;

g. Environmental relevance—in the case of dishwashers:

(i) Less Use of Resources:

At least one renewable raw material is advantageously integrated in the liquid constituent as a substitute for conventional bitumen (mineral-oil product). The use of fossil hydrocarbons (bitumen) can be reduced thereby. The bitumen currently used is thermally recycled (burnt). That releases $CO_2$ into the atmosphere, something that can be reduced by using the renewable raw-material constituent. Using renewable raw materials will hence enable the $CO_2$ emissions to be reduced and less use made of the fossil resources.

(ii) Energy Saving:

Production Process:

The novel reactive-bitumen mass is applied preferably at room temperature, in particular at around 20° Celsius. The process employed hitherto for melting on prefabricated bitumen mats with a hot-melt adhesive layer requires, by contrast, a high energy input during application because infrared radiators completely heat through the bitumen mats in an intricate process. Said energy be partially or completely saved by using reactive bitumen.

(iii) Finished Product:

Bitumen mats employed hitherto—in particular the bitumen itself—have/has a high thermal capacity. The bitumen consequently becomes a consumer of energy while the appliance, particularly a dishwasher, is operating because the material applied to the dishwasher also has to be heated.

The novel application method offers major advantages compared with the one currently employed.

(iv) Application Process:

The possibility of partial damping (only selected areas are covered with noise-deadening material) will enable better noise-deadening of places relevant to vibration.

Different layer thicknesses, layer areas, contours, shapes, etc. . . . can be applied.

CONCLUSION

Material requirements can be minimised. The result is that less material needs to be used (saving resources).

The reduced use of material means less energy is needed to heat the noise-deadening material while the dishwasher is operating. Energy consumption can consequently be reduced during each individual rinsing operation.

What is claimed is:

1. A domestic appliance, comprising:

at least one component; and at least one homogeneous sound-insulating coating applied on the component, the homogeneous sound-insulating coating including a reactively cured bituminous mixture.

2. The domestic appliance of claim 1, wherein the homogeneous sound-insulating coating is made entirely of the reactively cured bituminous mixture.

3. The domestic appliance of claim 1, embodied as a dishwasher.

4. The domestic appliance of claim 3, further comprising a rinsing chamber, said component being a wall section for delimiting the rinsing chamber.

5. The domestic appliance of claim 3, further comprising a rinsing container, said component being a base tray of the rinsing container.

6. The domestic appliance of claim 1, wherein the component is temperature-sensitive.

7. The domestic appliance of claim 1, wherein the component is made of plastic.

8. The domestic appliance of claim 7, wherein the plastic is polypropylene.

9. The domestic appliance of claim 1, further comprising a preliminary coating applied upon the component before application of the homogeneous sound-insulating coating, the preliminary coating being a member selected from the group consisting of lacquer and primer.

10. The domestic appliance of claim 1, wherein the bituminous mixture is free-flowing and curable and includes a mixture of at least one first constituent and of at least one second constituent, with the first and second constituents being configured in one of three ways, a first way in which the first constituent contains a basic bonding agent, a flux oil, and an added reactive agent that are mutually coordinated such that an activator is needed for curing, and in which the second constituent contains the activator, a second way in which the first constituent contains a basic bonding agent and a flux oil that are mutually coordinated such that an added reactive agent is needed for curing, and in which the second constituent contains the added reactive agent, a third way in which the first constituent contains a basic bonding agent and a flux oil that are mutually coordinated such that an added reactive agent and an activator are needed for curing, and in which the second constituent contains the added reactive agent and the activator.

11. A method for producing a domestic appliance, comprising applying at least one homogeneous sound-insulating coating of a reactively curing bituminous mixture to a component for sound insulating of the component.

12. The method of claim 11 for producing a domestic dishwasher.

13. The method of claim 11, wherein the homogeneous sound-insulating coating is sprayed onto the component.

14. The method of claim 11, wherein the bituminous mixture has at least one first constituent and at least one second constituent, with the first constituent including a liquid constituent to which at least one solid is added, and with the second constituent including a hardener.

15. The method of claim 14, wherein the oil and/or resin is made of renewable raw material.

16. The method of claim 14, wherein the at least one solid has at least one mineral constituent.

17. The method of claim 16, wherein the at least one mineral constituent is rock meal, Solnhofen cement, or white fine lime.

18. The method of claim 14, wherein the first constituent is made entirely of the liquid constituent to which at least one solid is added, and the second constituent is made entirely of the hardener.

19. The method of claim 18, wherein the liquid constituent includes one of oil and resin.

20. The method of claim 14, wherein the liquid constituent includes one of oil and resin.

21. The method of claim 11, wherein the homogeneous sound-insulating coating has uniform density.

22. The method of claim 11, wherein the homogeneous sound-insulating coating is applied by spraying.

23. The domestic appliance of claim 1, wherein the homogeneous sound-insulating coating has uniform density.

* * * * *